United States Patent [19]

Mori

[11] 4,024,063
[45] May 17, 1977

[54] FLOATING-MATTER REMOVING APPARATUS

[75] Inventor: Youzi Mori, Tokyo, Japan

[73] Assignee: Kabushiki Kaisha World Chemical, Tokyo, Japan

[22] Filed: July 9, 1975

[21] Appl. No.: 594,515

Related U.S. Application Data

[63] Continuation of Ser. No. 442,135, Feb. 13, 1974, abandoned.

[30] Foreign Application Priority Data

| Feb. 15, 1973 | Japan | 48-19021 |
|---|---|---|
| May 31, 1973 | Japan | 48-64080 |
| May 31, 1973 | Japan | 48-64081 |
| Aug. 3, 1973 | Japan | 48-87315 |
| Aug. 23, 1973 | Japan | 48-98836 |

[52] U.S. Cl. .................. 210/242 R; 210/DIG. 25
[51] Int. Cl.² ................................... E02B 15/04
[58] Field of Search ..... 210/83, 169, 242, DIG. 25; 416/184, 199

[56] References Cited

UNITED STATES PATENTS

| 3,252,576 | 5/1966 | Miller | 210/169 |
|---|---|---|---|
| 3,294,027 | 12/1966 | Denis | 416/184 |
| 3,348,690 | 10/1967 | Cornelisson | 210/242 |
| 3,661,263 | 5/1972 | Peterson | 210/DIG. 25 |
| 3,690,463 | 9/1972 | O'Brien | 210/242 |
| 3,690,621 | 9/1972 | Tenaka | 416/184 |
| 3,701,429 | 10/1972 | Schell | 210/DIG. 21 |
| 3,722,688 | 3/1973 | Wilschiry | 210/242 |
| 3,722,689 | 3/1973 | Markel | 210/242 |
| 3,830,370 | 8/1974 | Glaeser | 210/DIG. 25 |
| 3,853,767 | 12/1974 | Mohn | 210/242 |

*Primary Examiner*—Theodore A. Granger
*Attorney, Agent, or Firm*—George B. Oujevolk

[57] ABSTRACT

Apparatus for skimming matter such as oil, scum, and the like floating on water in rivers, lakes, oceans, water-tanks, settling-tanks. The apparatus is adapted to float on the water and comprises a vessel having a main floatable body with at least one inlet opening provided in the sidewall thereof and with matter storage container means in fluid communication with the sidewall inlet opening. A floatable gate means is provided externally on each sidewall inlet opening of the main body in slidably supported relationship to the latter and is adapted to float on the surface of the body of water outside the main floatable body. Each gate means includes a vertical gate plate externally disposed slidably on the inlet opening sidewall of the main floatable body, the gate plate having an inlet opening therein adapted to be at least partially aligned with the corresponding sidewall inlet opening, at which time only, the floating matter can enter the main floatable body through the at least partially aligned openings. The gate means further includes a float block at each side end of the gate plate whereby the opening in the gate plate over the sidewall inlet opening is maintained at a substantially fixed level relative to the surface, if changing, of a body of water on which the matter floats. Means for setting the lower edge of the inlet opening in the gate plate is adjustably mounted on the gate plate. Discharging means such as a pump may be provided either on the main body or on land separate from the apparatus in order to discharge the matter stored in the storage means to a suitable separate place. In a second embodiment of the invention, at least one water jet nozzle is movably placed about the main body for moving the oil, scum, etc., toward the main body.

10 Claims, 16 Drawing Figures

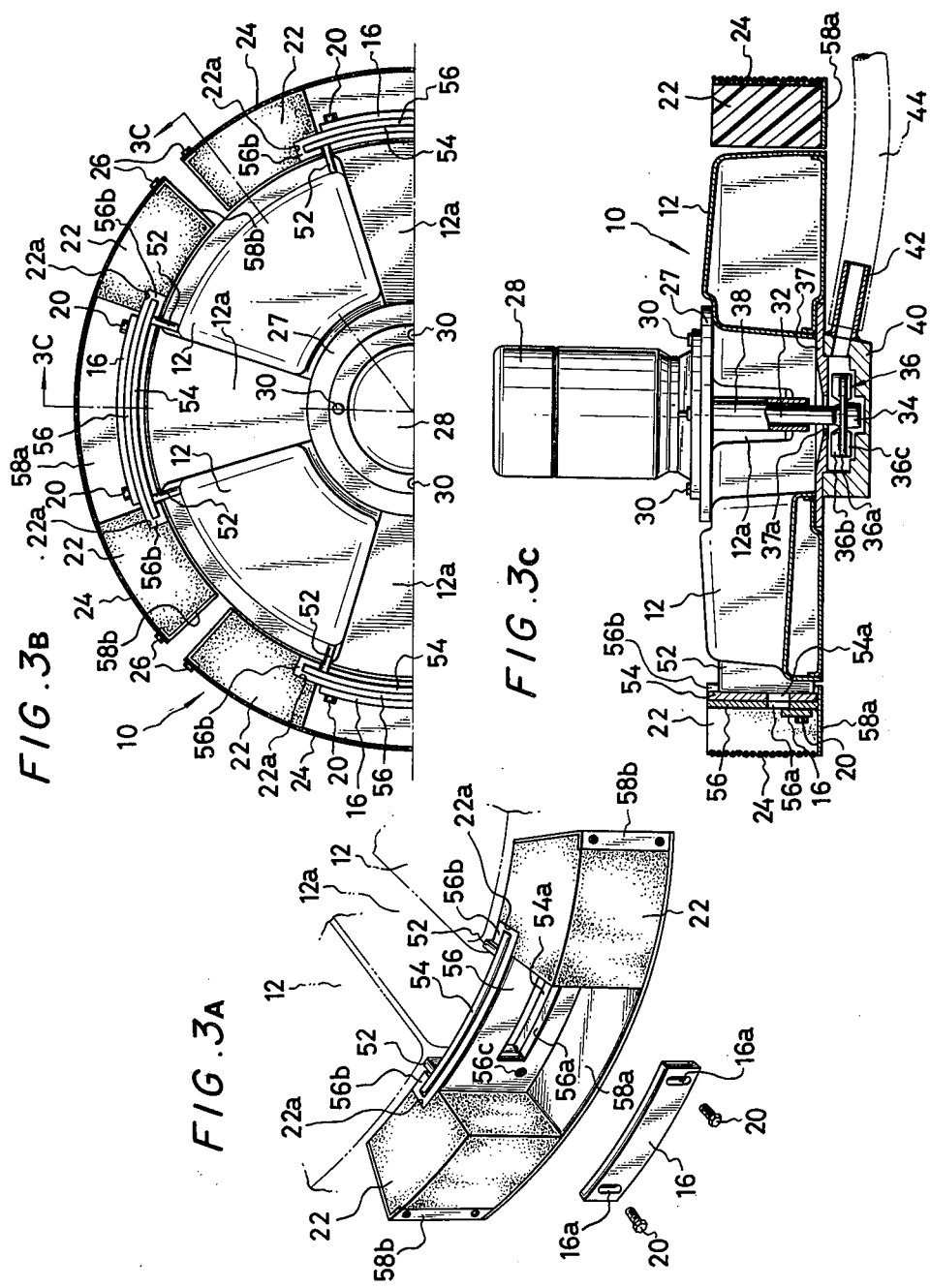

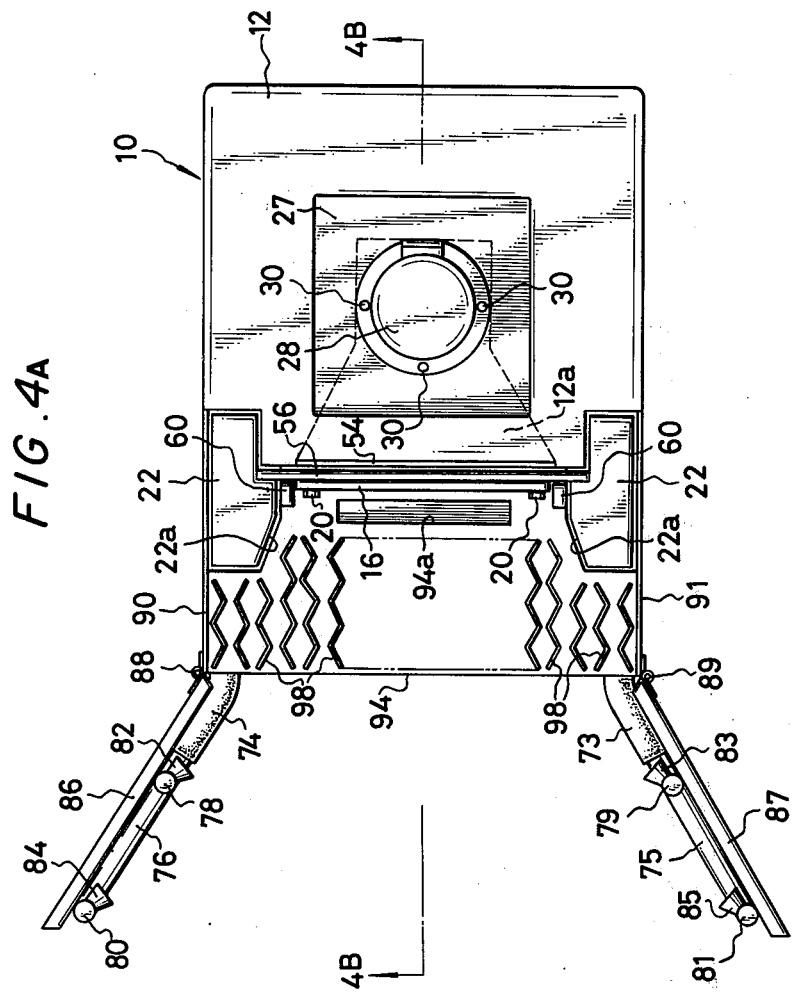

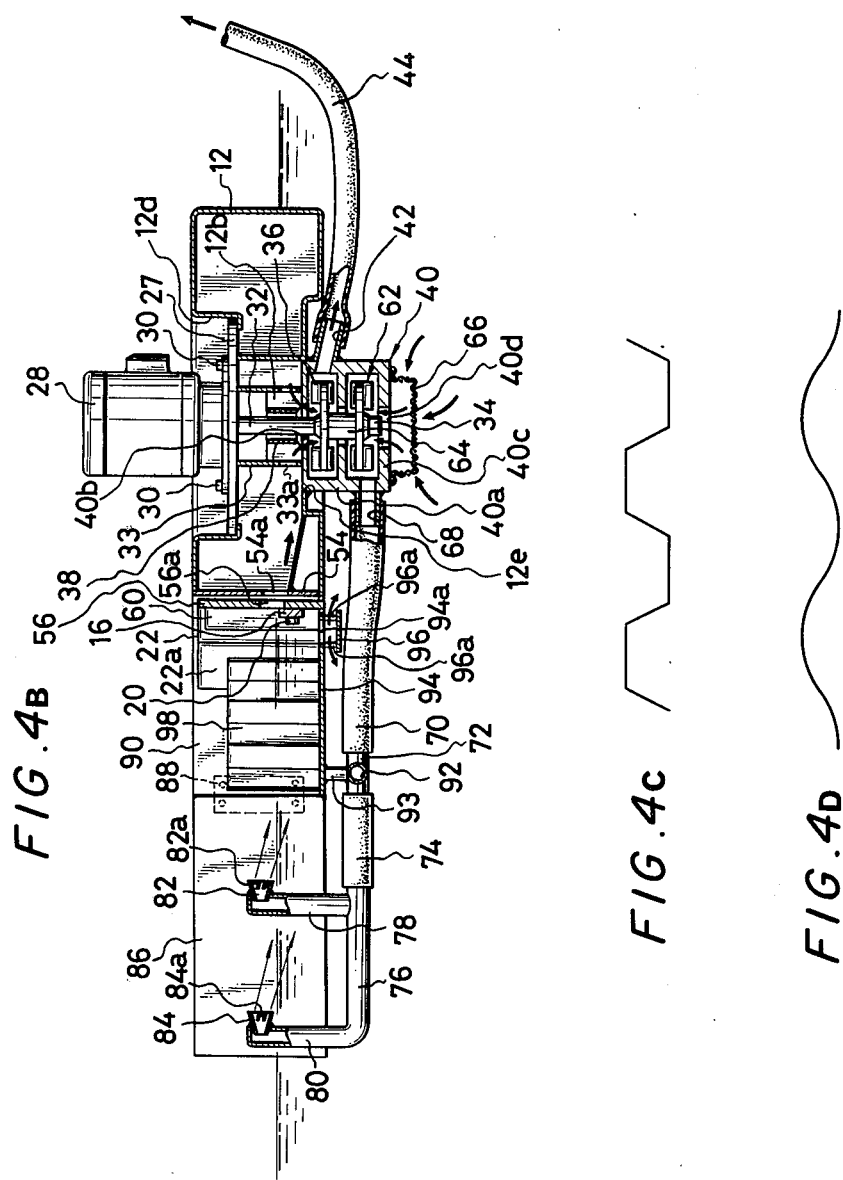

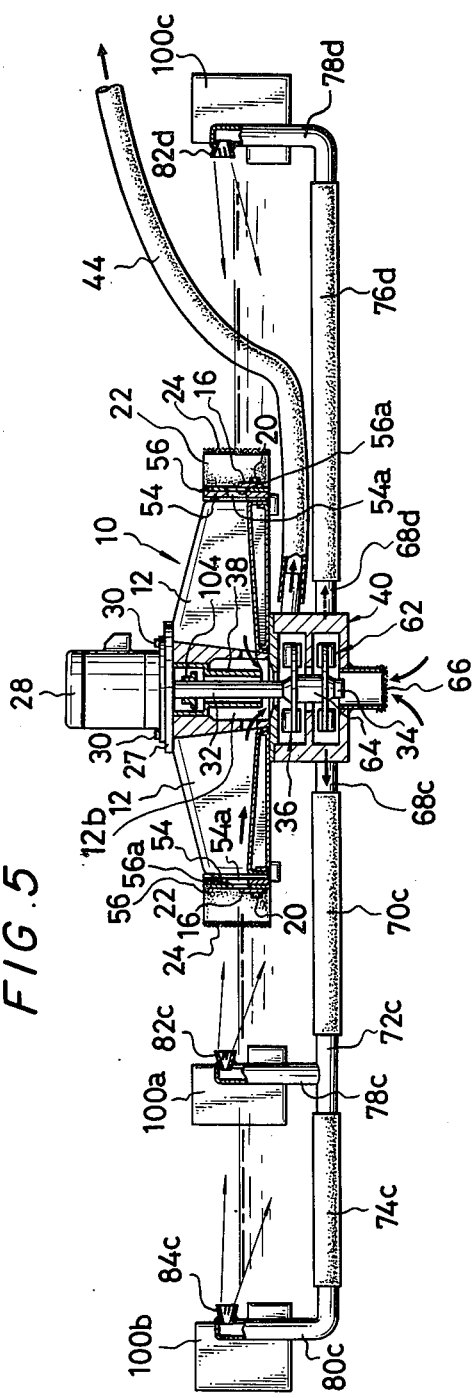
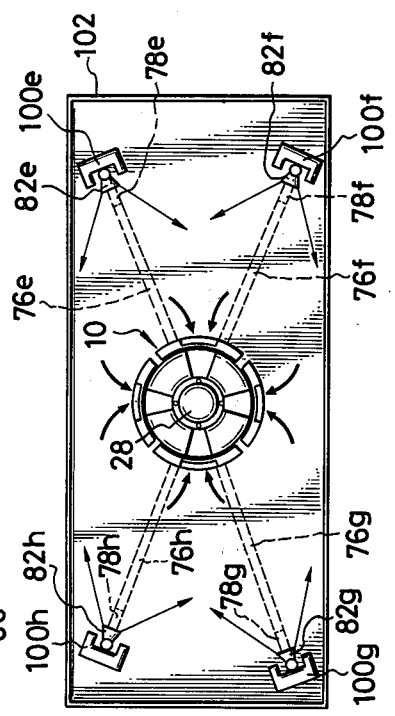
FIG. 5
FIG. 6

FLOATING-MATTER REMOVING APPARATUS

This is a continuation application of Ser. No. 442,135 filed Feb. 13, 1974, now abandoned.

BACKGROUND OF THE INVENTION

This invention relates to an apparatus for removing matter or substance such as oil, scum and the like floating on water in a river, a water-tank, an ocean and so on, and more particularly an apparatus which skims the matter thereinto and sends it to a processing arrangement installed on land.

BRIEF REVIEW OF THE PROBLEM

Recently, rivers, lakes, oceans, etc., have come to be polluted by various kinds of waste and refuse discharged from factories and as a result there is matter such as oil, scum, etc., floating on water in the rivers, the lakes, the oceans and the like. Generally speaking, there is also a similar floating matter on water in digesting tanks, settling tanks, water tanks and the like.

As one measure to counter this pollution, it has been proposed to skim the polluting matter by using a vacuum pump of large horse-power. However, the vacuum pump also pumps a large amount of water besides the polluting matter during operation, and is therefore low in efficiency. As another countermeasure, it has been proposed to surround the area of oil, scum, etc., by a fence and then skim the polluting matter by means of an absorbent such as cotton. However, this method is also ineffeicient.

OBJECTS OF THE INVENTION

It is therefore an object of this invention to provide an improved apparatus which can efficiently remove matter such as oil, scum, etc., floating in rivers, lakes, oceans, digesting tanks, settling tanks, water tanks and the like.

A further object of this invention is to provide an apparatus which can skim substantially only the layer of the floating matter mentioned above.

A still further object of this invention is to provide an apparatus which can continue a stable removing operation of a polluting substance without being hindered by waves which may be produced on the surface of the water.

Yet another object of this invention is to provide an apparatus which can rapidly remove polluting matter.

A further object of this invention is to provide an apparatus of simple structure which can function without bringing about a drop in discharging fluid pressure.

SUMMARY OF THE INVENTION

Briefly stated, the polluting matter skimming apparatus comprises a vessel having a main floatable body with at least one inlet opening provided in the sidewall thereof and with matter storage container means in fluid communication with the sidewall inlet opening. A floatable gate means is externally provided over each sidewall inlet opening of the main body in slidably supported relationship to the latter, each gate means consisting essentially of a vertical gate plate externally disposed slidably on the inlet opening sidewall of the main floatable body, the gate plate having an inlet opening therein adapted to be at least partially aligned with the corresponding sidewall inlet opening, at which time only, the floating matter can enter the main floatable body through the at least partially aligned openings. The gate means further includes inlet, and a float block at each side end of the gate plate whereby the opening in the gate plate over the sidewall inlet is maintained at a substantially fixed level relative to the surface, if changing, of a body of water on which the matter floats. Means for setting the lower edge of the inlet opening in the gate plate is adjustably mounted on the gate plate. Discharging means, such as a pump, may be provided either on the main body or on land separate from the apparatus in order to discharge the matter stored in the storage means to a suitable separate place. In a second embodiment of the invention, at least one water jet nozzle is movably placed about the main body for moving the oil, scum, etc., toward the main body.

The invention, as well as its various objects and advantages, as well as other objects and advantages thereof, may be more clearly understood by reference to the following detailed description in the light of the accompanying drawings, wherein the similar reference symbols or numerals are used to indicate the same and similar element and portions.

BRIEF DESCRIPTION OF THE DRAWINGS

FIG. 3A is a fragmentary perspective and partially exploded view of a third embodiment of floating matter removing apparatus according to this invention;

FIG. 3B is a fragmentary plan view of the embodiment shown in FIG. 3A;

FIG. 3C is a sectional view of the embodiment shown in FIG. 3B, taken on the line 3C — 3C of FIG. 3B;

FIG. 4A is a diagramatical plan view of a fourth embodiment of a floating matter removing apparatus made according to this invention, shown as being in a floating condition;

FIG. 4B is a diagramatically sectional view of the embodiment shown in FIG. 4A, taken on the line 4B — 4B of FIG. 4A;

FIGS. 4C and 4D are diagrammatical plan views of modifications of wave dampening members for use with the embodiment shown in FIGS. 4A and 4B;

FIG. 5 is a view similar to FIG. 4B and of a fifth embodiment of a floating matter removing apparatus according to this invention; and, FIG. 6 is a diagramatical plan view of a sixth embodiment similar to the fifth embodiment and of a floating matter removing apparatus according to this invention.

DESCRIPTION OF PREFERRED EMBODIMENT

Several embodiments of this invention are hereinafter described in turn with respect to the accompanying drawings, but an embodiment of this invention is described only concerning the structural and operational portions thereof different from the structures and operations of the preceding embodiments of this invention. Therefore, it should be noticed that structural and operational portions not described concerning any embodiment are similar to or the same as those of the preceding embodiments.

Figure 1A:
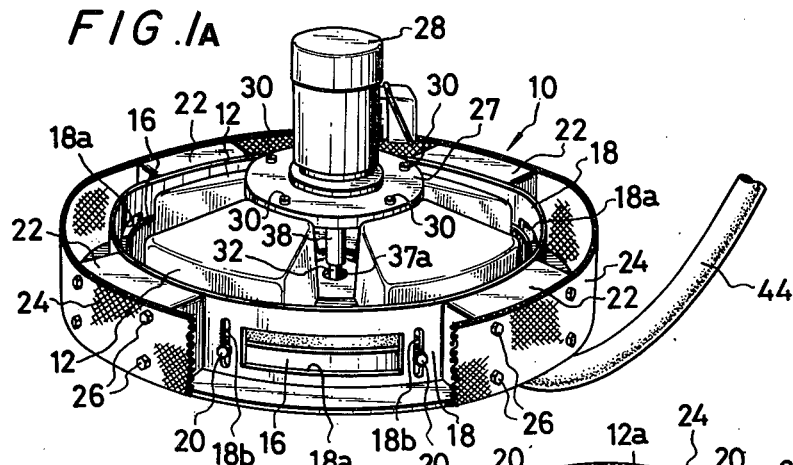
FIG. 1A is a perspective view of one form of floating matter removing apparatus according to this invention, wherein a ring-like strainer is partially broken away to illustrate the inside member arrangement of the apparatus.
Figure 1B:
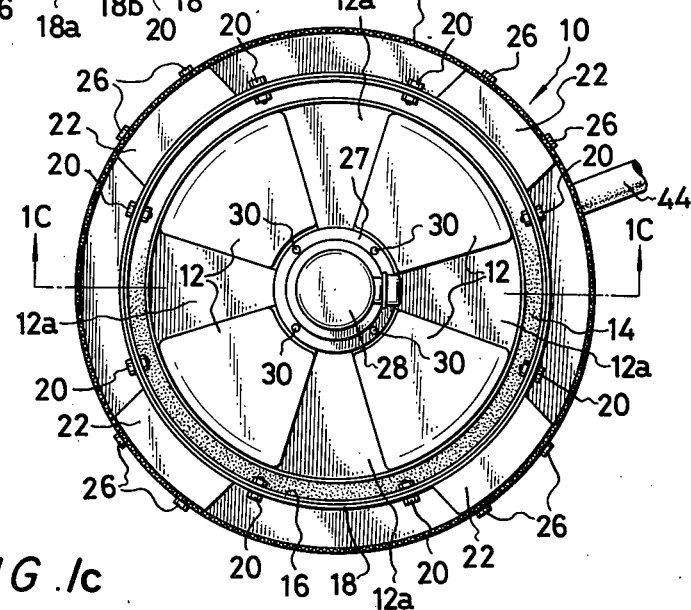
FIG. 1B is a diagramatical plan view of the one form of the apparatus shown in FIG. 1A.
Figure 1C:
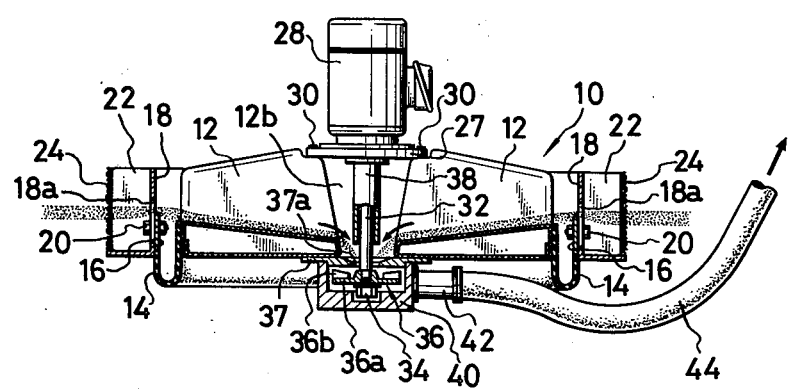
FIG. 1C is a diagramatical sectional view of the embodiment shown in FIG. 1B, taken on the line 1C — 1C of FIG. 1B and shown as being in a floating condition.

Referring to FIGS. 1A to 1C, there is shown a first preferred embodiment of a floating matter removing apparatus 10 according to this invention, including a ring-like member movable up and down relative to a main floatable body, said ring-like member setting or determining the lower edges of the inlet openings for floating matter provided in the sidewalls of the main body.

The main body 12 may preferably be of a thin plate or a block of plastic resin such as vinyl chloride, polypropylene, reinforced plastic, acrylonitrile-butadienestyrene resin, etc., metallic material such as iron, stainless steel, or a block of foamed plastic containing cavities therein to increase the buoyancy of the main body 12. However, a material suitable for the main body may be selected depending on the quality of a floating matter to be treated.

The body 12 is substantially a disc as shown in the drawings, and includes a plurality of depressed matter entering passages 12a provided thereon as inwardly sloping down for the purpose of facilitating the entering of the matter. Each passage 12a leads to and communicates with a matter falling passage 12b extending vertically at the center of the main body 12.

Disposed around the lower portion of the outer circumference of the main body 12 is a connecting member 14 shown as being U-shaped in section, one branch portion of the U-shape being connected to the former by a suitable fixing means (not shown) so as not to obstruct the inlet of each channel 12a. The U-shaped member 14 is made of a flexible material such that one branch portion thereof may move substantially freely vertically and horizontally relative to the other branch portion thereof. Provided on the top of the other branch portion of the U-shaped member is an upright rigid ring-like belt 16 of a predetermined width for determining the lower edge of the inlet opening of each floating matter passage 12a. Further around the periphery of the ring-like belt 16 is disposed ring-like member 18 which has a plurality of horizontally rectangular inlet opening 18a, each provided in that portion of the annular member 18 opposite to the inlet opening of each passage 12a, each opening 18a being of a horizontal width substantially equal to that of the inlet of each passage 12a.

In the annual member 18 near both side edges of each inlet opening 18a are provided two vertically elongated slots 18b, respectively, into which corresponding fixing members 20 can be inserted to fix the ring-like belt 16 to the annular member 18 at a desired position in the vertical range of the length of the slots 18b, in view of the thickness, viscosity, etc., of the floating matter, the center of gravity of the apparatus and wave conditions at the water surface. This means setting the lower edges of all the openings 18a of the annular member 18 so that substantially only the floating matter in question may enter through the openings 18a into the corresponding passages 12a when a suction pump to be more particularly described hereinafter is activated.

On the outer surface of the annular member 18 between the inlet openings 18a thereof are disposed a plurality of float blocks 22, each being, for example, of plastic foam or the same material as the main body mentioned above. Around these float blocks 22 is secured a common strainer or filter 24 taking the form of an endless belt by suitable fixing members 26.

On the center of the top of the body 12 is mounted an electric motor 28 of the totally enclosed outdoor type at the center of the top of the body 12 through a base plate 27 by fixing members 30. A shaft 32 of the motor 28 extends downward through a matter falling passage 12b. A pump including a runner or impeller 36 and a casing 40 therefor is mounted through a mounting base 37 on the lower surface of the main body. Over the lower end of the shaft 32 is a nut 34 securing a runner or impeller 36 including a disc 36a with a plurality of arched blades or vanes 36b disposed in the form of a spiral on the upper surface of the disc 36a. As shown, the shaft is guided by a pipe 38 also extending downward from the lower surface of the casing of the motor 28.

The mounting base 37 has a hole 37a provided in the center thereof for guiding the entering matter into the casing 40. The shaft 32 of course extends through the hole 37a downward into the casing 40. An exhaust pipe leading through a hose 44 to a processing mechanism on land (not shown).

In operation, in skimming the floating matter, as seen in FIG. 1C, the belt 16 is set at such a position that the top end surface thereof may be at an optimal level at which water can substantially not enter through the inlet openings 18a of the annular member 18 and the corresponding passages 12a as mentioned above, and then the ring-like belt 16 is fixed to the member 18 by the fixing members 20.

Then, the apparatus is placed substantially in the center of the floating matter. Thus, floating matter will pass through the inlet openings and the corresponding passages 12a into the pump casing 40 and be stored there. When the motor 28 is actuated the pump will discharge the matter stored in the pump casing 40 through the pipe 44 to the de-oiler installed on land.

It should be noted that since the impeller 36 is of the down-suction type, the floating matter except for the water can efficiently be pumped. This apparatus uses neither mechanical seals nor packings and does not have difficulties such as idling and seizure of the runner which otherwise might occur. This apparatus is simple in structure, and may be easily manufactured at a low manufacturing cost. The strainer 24 serves to prevent big debris from entering the pump casing 40 to injure the interior of the casing 40 and the runner 36 contained therein. The float blocks 22 are connected to the main body 12 through the flexible U-shaped member 14 so that they can float substantially irrespective of the main body 12, thereby preventing an inclination or rake of the apparatus due to waves which may occur on the surface of the water.

Referring to FIGS. 2A to 2D, there is shown a second embodiment of this invention which can improve the skimming efficiency on the inlet side of the pump and prevent a decrease in fluid pressure on the discharging side, thereby enhancing removing efficiency.

Figure 2A:
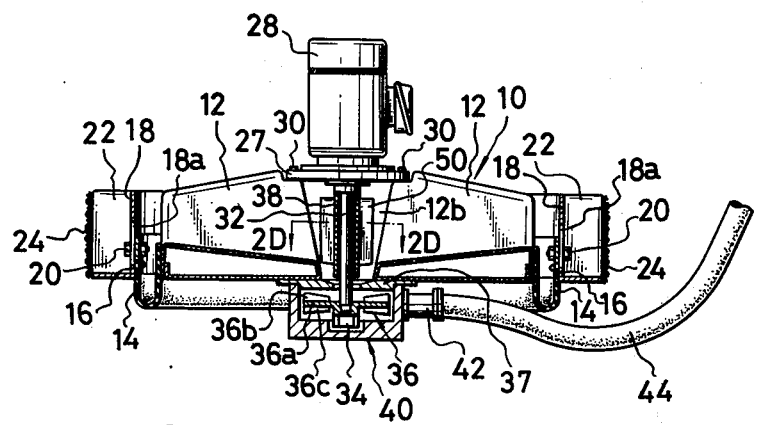
FIG. 2A is a view similar to FIG. 1C and of a second embodiment of a floating matter skimming apparatus made according to this invention.
Figures 2B, 2C:
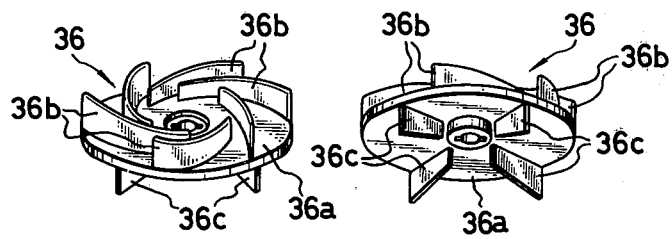
FIG. 2B is a downward perspective view of one form of an impeller for use with the embodiment shown in FIG. 2A.
FIG. 2C is an upward perspective view of the one form of the impeller shown in FIG. 2A.
Figure 2D:
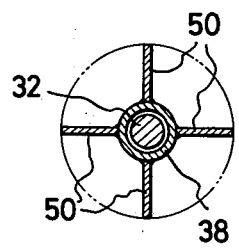
FIG. 2D is a sectional view of the embodiment shown in FIG. 2A, taken on the line 2D—2D of FIG. 2A.

Referring particularly to FIG. 2A, the guiding pipe 38 for the shaft 32 is provided on the outer surface thereof with a plurality of radial fin plates 50 extending axially equiangularly in order to prevent matter falling into hole 12b from being rotated due to the centrifugal force of a runner to be hereinafter described and from being obstructed to enter the casing 40.

The runner 36 mounted on the lower end of the shaft 32 is provided with a plurality of plate-like vanes 36c radially extending at equal angles to each other on the lower surface of the disc 36a besides the vanes 36b arranged in the form of a sprial on the upper surface. In this particular embodiment, the impeller 36 is provided with four vanes 36c disposed at right angles to each other.

When the runner 36 is rotated by the motor 28, the lower vanes 36c produce a high fluid pressure on the lower side of the disc 36c, thereby preventing a possible decrease in the discharging pressure which would occur in the case of a single side type impeller, for example, shown in FIG. 1C since a highly pressurized fluid on the upper side of the disc 36a moves to the lower side thereof under a low pressure condition.

If floating matter such as scum is skimmed, it is desirable to use a runner whose upper and lower vanes are wide vertically and small in number. In order to enhance the pressure of fluid on the discharge side of an impeller, it is desirable to use a large-diameter runner with many vanes.

Referring to FIGS. 3A to 3C, there is shown a third embodiment of this invention including a plurality of floatable gate means which can reciprocate vertically depending on possible waves produced on the water independent of each other to bring about a stable skimming operation.

Provided on the outer circumference of the main body 12 near both side edges of the inlet opening of each floating matter passage 12a are a pair of mounting members 52 respectively, extending a short length radially outwardly on which is mounted a gate means supporting plate 54 which also function as a part of th sidewall of the main body 12. The supporting plate 54 traverses the inlet of each passage 12a and has a horizontally elongated inlet opening 54a.

Externally provided slidably on each supporting plate 54 is a gate means having a vertical gate plate 56 disposed slidably on the supporting plate 54. The gate plate has an inlet opening 56a adapted to be at least partially aligned with the opening 54a. At either side ends of each gate plate 56, the gate means includes two groove portions 56b integral with the plate 56 and of the U-shape, as viewed in a plan view. The groove portions 56b may be a single piece. Stops may be provided on the top surface of both groove portions 56b, extending radially internally a desired length across the upper surface of the supporting member 54 for preventing the gate plate 56 and the associated floatable blocks 22 integral therewith from falling off the main body. A transversely elongated plate 16 is mounted on the outer surface of the gate plate 56 by inserting and tightening the fixing members 20 into holes 16a of the elongated plate 16 and the corresponding holes 56c of the gate plate 56 at a desired vertical position in the scope of the length of the holes 16a relative to the gate plate 56 so that the lower edge of the opening 56a is set at a desired level, in the same manner as described in the preceding embodiments.

On both sides of the inlet of each floating matter passage 12a and close to the outer circumference of the main body 12 are disposed two float blocks 22 of the gate means shown as being made of, for example, plastic foam, respectively, and taking the form of a sector as viewed in a plan view, which may be connected to a common base plate 58a and upright side frames 58b disposed at both side ends of the plate 58a intergral therewith. Both float blocks 22 have the gate plate 56 mounted thereon by securing the guiding groove portions 56b to vertically extending complementary depessions 22a provided at the corner portions of the blocks 22, respectively, close to the inlet of each passage 12a.

Now, assume that waves are produced on the water. Then all the plurality of floatable gate means slide up and down independently of each other but relative to corresponding supporting members 54 and therefore the main body 12 depending on the magnitudes of the waves. Thus, the respective lower edges of the gate plate openings will be maintained substantially at a predetermined height relative to the matter-water interface, whereby a satisfactory skimming operation can be continued. The floating matter can enter the passage 12a through the inlet opening 54a and 56a when these inlet openings are at least partially aligned.

Referring to FIGS. 4A and 4B, there is shown a fourth embodiment of this invention which can rapidly move the floating matter toward the inlet of the floating matter passage (in this particular embodiment, there is provided only one passage 12a). This embodiment can treat floating matter covering a wide area of the surface of the water and can substantially satisfactorily function at a place where waves are high, it can shut out possible waves which may come from right and left, dampen possible waves which may come from the forward direction, and suppress possible waves or shocks which may come from below.

The motor 28 is installed on a base plate 27 by fixing members 30 in a depression 12d provided on the top surface of the main body, thereby positioning the center of weight of the motor 28 at a low level with a view to stability. The base plate 27 is supported by a cylindrical member 33 which is in turn supported by the runner casing 40 which is circumferentially secured, for example, by welding at the upper portion thereof to the corresponding inner surface of a hole 12e provided in the bottom of the main body. The cylindrical member 33 has at least one floating matter inlet opening 33a in the lower side wall thereof and further includes therein a coaxial guiding pipe 38 integral therewith.

A pair of guide members 60 respectively are externally provided close to the opposite side ends of gate plate 54 in order to allow the gate plate to vertically slide between guide members 60 and supporting plate 54.

The upper plate part of an upper-pump casing portion 40a of the pump casing 40 includes a floating matter inlet 40b through which the shaft 32 of the motor 28 extends downward on which an upper runner 36 of the down-suction type similar to that shown in FIG. 3C is mounted in the upper casing portion 40a. The shaft further extends downward through the bottom part of the upper casing portion 40a into a lower-runner casing portion 40c integral with the upper-runner casing portion 40a in which a lower runner 62 of the up-suction type is mounted on the lower end portion of the shaft 32 by the nut 34. The lower runner 62 takes substantially the same size as the upper runner 36 with a ring spacer 64 fitted around the shaft 32 between the upper and lower impellers 36 and 62.

Both casing portions 40a and 40c have a common partition with a hole through which the ring spacer 64 and therefore the shaft 32 extends, with an annular space being formed about the ring spacer 64 at the of the hole position. The lower casing portion 40c includes a water inlet 40d provided in the center of the bottom of thereof and covered with a strainer 66 provided outwardly thereof and taking substantially the form of a cylinder. Since the down-suction type and the up-suction type runners 36 and 62 are of substantially the same size as described before and shown in FIG. 2B and 2C and both casing portions 40a and 40c are also of substantially the same size, the fluid pressure in both casing portions 40a and 40c can substantially be balanced or equilibrated with each other during operation, thereby preventing fluid in one casing portion from moving into the other casing portion through the annular space formed about the ring spacer 64 at the partition hole.

An outlet pipe 68 is connected at one end to the side wall of the lower casing portion 40c so as to fluid communicate with the inside of the lower casing portion 40c. The pipe 68 extends substantially horizontally forward and is connected through a hose 70, an intermediate pipe 72 and a second hose 74 to a second intermediate pipe 76 with a first water-conveying pipe 78 branching uprightly from near the backward end of the pipe 76 and a second water-conveying pipe 80 uprightly extending from the forward end of the pipe 76. The water-conveying pipes 78 and 80 have water jet nozzles 82 and 84 provided thereon near the top of the pipes 78 and 80, the jet nozzles 82 and 84 being adapted to jet water in a sectional pattern through a plurality of small backward downward inclined holes 82a, 84a, provided therein against the floating matter to move it toward the inlet in the sidewall of the main body. The water-conveying pipes 78 and 80 are in place by suitable means (not shown) secured to an upright guiding wall 86 which is, in turn, swingably connected at one side edge thereof by a hinge 88 to an adjoining side edge of an upright side plate 90.

The first intermediate pipe 72 has a branch pipe portion 92 supported by a supporting member 93 extending downward from a base plate to be described later more specifically. The branch pipe portion 92 extends sidewards to and communicates with a third intermediate pipe portion (not shown) similar to pipe 72 which is connected through a third hose 73 to a fourth intermediate pipe 75. A third water-conveying pipe 79 branches upright from near the backward end of the pipe 75 and a fourth upright water-conveying pipe 81 extends upwards from the tip end of the pipe 75. The water-conveying pipes 79 and 81 have also jet nozzles 83 and 85, respectively, mounted thereon, as in the case of the water-conveying pipe 78 and 80. The water-conveying pipes 79 and 81 are also secured in place by suitable means (not shown) to a second upright guiding wall 87 which is, in turn, connected at one side edge by a second hinge 89 to an adjoining side edge of a second side plate 91.

The side plates 90 and 91 are secured at the lower ends thereof to both side ends of a bottom plate 94 lying in front of the lower edge setting plate 16 and secured in place to the main body 12. The bottom plate 94 has an elongated transverse slot 94a provided therein which is substantially directly in front of the lower edge setting plate 16 below which slot 94a is suspended a baffle plate 96 at a short distance from the bottom plate 94 by suitable supporting means 96a.

To the upper surface of the bottom plate 94 in front of the slot 94a are secured a plurality of upright wave dampening members 98 arranged substantially parallel to the direction of arrival of possible waves, each dampening member taking the form of successive sawteeth, as viewed in a plan view and any two adjacent dampening members being disposed in a mirror image relation to each other. Each wave dampening member may be of a zigzag form as diagrammatically shown in FIG. 4C or be of a sinusoidal wave form as diagramatically. In the particular FIG. 4D. In the particular embodiment, a cross plate may be provided as a roof for the plurality of wave dampening members 98 wherein the side plates 90 and 91 are firmly connected at the upper ends thereof to the cross plate.

In operation, at first, this apparatus is positioned near the area of the water surface that the undesired floating matter covers. Then, the guiding walls 86 and 87 are opened at a proper angle so as to receive the undesired matter therein.

When the upper runner 36 is rotated by the motor 28, the lower runner 62 is simultaneously rotated and water is sucked into the lower casing portion 40c through inlet 40d and from there is sent through the pipes 68, 70, 72, 74, 76 to water-conveying pipes 78, 80 and through the pipes 72, 92, 73, 75 to water-conveying pipes 79, 81. Thus, the water is jetted in a sectional pattern from the nozzles 82, 84 and 83, 85, against the floating matter on the water to move it rapidly toward the main body 12 and particularly toward the opening 56a of the sliding gate plate 56.

Both guiding fences 86 and 87 can shut out possible waves which may come from laterally, the bottom plate 94 can suppress possible waves or shocks which may come from below, and the plurality of wave dampening members 98 can dampen possible waves which may come from forward and beat against the apparatus, thereby preventing a large quantity of water from increasing suddenly directly in front of the inlet 56a of sliding gate 56 to enter passage 12a through inlet 56a. Of course, when water increases just in front of inlet 56a, extra water falls through slot 94a by its own weight and flows in all directions substantially parallel to baffle plate 96 as shown in the arrows in FIG. 4B thereby preventing water from entering the inlet 56a. The baffle plate 96 serves to shut out possible waves which may come from below to pass through slot 94a upward. In other words, substantially only matter floating on the surface of the water is allowed to enter the passage 12a through the opening 56a. As is clear from above, provisions of the wave dampening, suppressing, shutting out members, etc., make it possible to use this apparatus even at a place where waves are high.

If desired, a propulsion means including an engine, a compressed-air motor, etc., may be mounted on the apparatus to move by itself here and there on the surface of the water.

Referring to FIG. 5, there is shown a fifth embodiment of this invention including a plurality of water jet nozzles of the type described in the fourth embodiment shown in FIGS. 4A and 4B which can be set at any desired position on the water within a certain range, thereby efficiently driving the floating matter into the main body.

Connected to a side wall of the lower casing 40c is a discharge pipe 68c which is, in turn, connected through a first hose of flexible matter 70c and through a first intermediate pipe 72c to a first upright water conveying pipe 78c. The intermediate pipe 72c is connected through a second hose pipe 74c of flexible material, for example, soft rubber to a second upright water-conveying pipe 80c. The water-conveying pipes 78c and 80c have jet nozzles 82c and 84c mounted near the top thereof and are mounted in place by suitable means (not shown) on separate float blocks 100a and 100b, floating on the surface of the water.

To the opposite side wall of the lower casing 40c is connected a second discharge pipe 68d which is in turn connected through a second flexible hose 76d, which can be made of soft rubber, for example, to a third upright water-conveying pipe 78d with a third jet nozzle 82d mounted thereon near the top, the third water-conveying pipe 78d being mounted on a third separate float block 100c floating on the surface of the water. The jet nozzles 82c, 83d and 84c are structurally similar to those shown in FIGS. 4A and 4B.

The float blocks 100a, 100b, and 100c with the jet nozzles 82c, 84c and 82d mounted thereon, can be set at any desired separate positions on the surface of the water in the respective ranges of lengths of the hoses 70c, 74c and 76d due to the flexibility thereof, thereby enlarging the range in which the floating matter is skimmed.

The guide pipe 38 through which the shaft 32 is guided includes an upper, shorter enlarged inner-diameter portion. In the upper enlarged inner-diameter portion, a disc 104 is mounted over the shaft 32, which disc has a flange portion whose outer diameter is larger than the inner diameter of the lower, inner-diameter portion of the guide pipe 38, thereby preventing the matter entering into the falling passage 12b from being scattered upward against the motor 38 through the reduced inner-diameter portion of the pipe 38. In the particular embodiment, the upper, enlarged inner-diameter portion of the guiding pipe is surrounded and held firmly by the upper, complementary inner-wall surface of the matter falling passage 12b of the main body 12.

In this particular embodiment, there is a lower strainer 66 which covers the lower open end of a cylindrical member protruding downward from the bottom of the lower casing 40c.

The number of jet nozzles and float blocks may be changed according to the width and the thickness of the floating matter, as is clear from a modification of this invention shown in FIG. 6 wherein four jet nozzles 82e, 82f, 82g and 82h are used in a water tank 102.

In all the above embodiments, a pump including an impeller may separately be installed on land. In that case a storage container means in fluid communication with the passages 12a may be provided at that position of the pump casing of each of the above embodiments. A discharge pipe 44 will be provided at one end in fluid communication with the storage means and at the other end in fluid communication with a suction means such as a suction pump, pressure reducing means, or the like, installed on land. The motor 28 may also be installed on the lower surface of the main floatable body 12.

Besides matter such as floating oil, the apparatus according to this invention may be used to remove slurry, mud-like liquid and any separate layer of liquid matter floating on water in rivers, lakes and the oceans.

I claim:

1. In a floating apparatus for removing polluting floating matter from the surface of water, said apparatus having:
   a. a vessel main floating body (12) with a sidewall, said sidewall having an inlet opening (54a) for the floating matter, said body (12) having therein a radial passage (12a) sloping inwardly downwards defining a travel path for the floating matter, said passage (12a) having one end terminating in said inlet opening in the sidewall and the other end being within said body (12);
   b. storage container means (40) provided on said body (12) in fluid communication with said other end for collecting floating matter entering through said inlet opening (54a), with outlet means (42) for discharging lighter liquid to a proper place; the improvement therein wherein said apparatus has an independent slidable external floatable gate arrangement, comprising in combination:
   c. a vertical gate plate (56), said plate having opposite ends, said plate being slidably disposed over said inlet opening (54a);
   d. a pair of float blocks (22) coupled to said plate opposite ends, for supporting the gate plate on the surface of the water; and,
   e. a gate plate inlet port (56a) in said gate plate (56) so disposed as to be adapted to be at least partially aligned with said inlet opening (54a) so that when said port (56a) and said inlet opening (54a) are so aligned, floating matter will pass therethrough.

2. An apparatus according to claim 1, wherein said inlet opening (56a) in said vertical gate plate has a lower edge, said apparatus further including setting means for setting the lower edge of said inlet opening in said vertical gate plate at a substantially fixed level relative to the surface of said body of liquid.

3. An apparatus according to claim 2, wherein said setting means includes a setting plate (16) with two vertically elongated slots (16a) of a certain length near the opposite side ends thereof, said gate plate (56) having two fixing holes (56c) respectively provided at the opposite ends thereof, and two fixing members (20) respectively inserted through said two elongated slots (16a) into corresponding ones of said holes (56c) in said gate plate (56) for fixing said setting plate (16) to said gate plate (56), whereby the lower edge of the opening (56a) in said gate plate is set at a desired height in the range of the length of said elongated slots (16a) in said setting plate.

4. An apparatus according to claim 2, wherein said gate plate has a pair of vertical groove portions (56b) formed respectively at the opposite ends thereof, said inlet opening (54a) sidewall of said main floatable body being formed of a supporting plate (54) having an inlet opening (54a) therein, and having opposite side ends respectively received slidably in said groove portions (56b) of said gate plate.

5. An apparatus according to claim 2, including a supporting plate (54) having said inlet opening (54a) therein, said supporting plate (54) having opposite ends, a pair of upright guide members (60) provided outwardly of said opposite side ends of said supporting member (54) such that said gate plate (56) is slidably received against said supporting member (54) and between said pair of upright guide members (60).

6. An apparatus according to claim 1, further including discharging means in said storage container means, said discharging means including an impeller (36), said discharging means and said storage container means forming a pump.

7. An apparatus according to claim 6, wherein said impeller has a driven shaft, said apparatus further including a guiding pipe (38) through which said driving shaft is guided, and a plurality of radial fin plates (50) provided equiangularly on the outer circumference of said guiding pipe for preventing a possible swirling of the floating matter when it enters said storage container means.

8. An apparatus according to claim 1, further including jet means (82-85) for forcing the floating matter to move said inlet opening (56a) in said gate means by jetting liquid against the floating matter and a float block (100) mounting and supporting said jet means thereon, and means for providing liquid to said jet means.

9. An apparatus according to claim 8, wherein said liquid providing means comprises a pump (40d, 62) including an impeller (62) having an inlet end (40d) open downwardly through which the liquid is adapted to be suctioned and an outlet end (68) through which the suctioned liquid is adapted to be fed to said jet means, said pump impellers (36 and 62) of said discharging and said liquid providing means having a common driven shaft (32).

10. An apparatus according to claim 9, further including a length of flexible pipe (70c, 74c, 76d–76h) communicating between each of said jet means and said liquid providing pump so as to set said corresponding jet means at any desired position in the range of the pipe length on the surface of the body of liquid.

* * * * *